VARIABLE BANDWIDTH VIDEO SIGNAL TRANSLATING CIRCUIT

Filed Sept. 24, 1964 2 Sheets-Sheet 1

INVENTOR.

GÉRARD MELCHIOR

By [signature] agent

VARIABLE BANDWIDTH VIDEO SIGNAL TRANSLATING CIRCUIT

Filed Sept. 24, 1964 2 Sheets-Sheet 2

INVENTOR.

GÉRARD MELCHIOR

By [signature] agent

United States Patent Office 3,489,851 Patented Jan. 13, 1970

3,489,851

VARIABLE BANDWIDTH VIDEO SIGNAL TRANSLATING CIRCUIT

Gérard Melchior, Levallois, France, assignor to Compagnie Francaise de Television, a corporation of France Filed Sept. 24, 1964, Ser. No. 398,885
Claims priority, application France, Oct. 4, 1963, 949,555
Int. Cl. H04n 3/16
U.S. Cl. 178—7.1 3 Claims

ABSTRACT OF THE DISCLOSURE

A video-frequency signal translating arrangement including a pre-emphasis network for emphasizing the higher frequency components of the signal transmitted, supplied with a limiter for clipping large amplitude signals above the channel threshold capacity, and a signal spreader for increasing the duration of the clipped signals, thereby reducing distortion of the output signal.

The present invention relates to video-frequency transmitter circuits.

It is known to modify a signal to be transmitted by passing it through a filter, designated a pre-emphasis filter, whose amplitude-frequency characteristic is an increasing function of frequency.

At the receiver, this modification is compensated for by passing the signal through a de-emphasis filter, which is the inverse of the pre-emphasis filter. The term inverse filters mean two filters such that when passing a signal through the two filters connected in series the signal is restored with practically no amplitude or phase distortion. The amplitude-frequency characteristic of the de-emphasis filter is thus a decreasing function of frequency.

In the manner signal reproduction fidelity is basically respected, since on this point the net distortion is zero.

Such is not the case with regard to the noise added to the signal between the transmitter and the receiver, since this noise passes throug the de-emphasis filter and not through the pre-emphasis filter.

It is also known that pre-emphasis effectively reduces noise, by increasing the signal to noise ratio. This noise reduction is particularly useful in frequency modulation systems. This advantage is, however, obtained at the cost of a drawback which becomes rather serious when the signals to be transmitted are video-frequency signals.

For a given transmission channel, the maximum signal power that can be transmitted, termed "channel admission power," is always limited.

For wide-band signals, the higher frequency signals commonly have low amplitude components. These low amplitude signals tend to become submerged in noise. The pre-emphasis circuit characteristically provides more gain to the higher frequencies. Pre-emphasis circuits or noise reducing circuits are normally employed in signal transmission systems.

However, if the signal includes large amplitude high frequency components, the pre-emphasis circuit will cause such components to overload the channel by exceeding the "channel admission power." This problem occurs in video-frequency signals with steep-fronted transitions, such as in scanning across sharp boundaries. In such cases there is a considerable widening of the range of variation of the level of the pre-emphasized signal with respect to the range of variation of the level of the non-pre-emphasized signal, consequently a considerable increase in the maximum power of the signal.

One known solution for preventing overload of the transmission channel by the pre-emphasized signal is the use of a limiter which brings down to a suitable threshold value the peaks of the signal before it is applied to the transmission channel. The drawback of this solution is the distortion suffered by the signal which is finally obtained at the receiver, since the signal entering the de-emphasis filter will differ from the signal leaving the pre-emphasis filter in that portions of the signal will be clipped.

It is an object of the invention to provide an improvement to arrangements for limiting a video-frequency signal in order to considerably reduce the distortion of the output signal. To this end, conventional limiter is replaced by a more complex device which combines the limitation of the peaks of the pre-emphasis signal with an increase of their duration.

The circuit comprising this complex device spreads out, so to say, the level peaks and consequently will be termed "spreader."

For the signal which is finally reconstituted at the receiver, spreading of the peaks leads to much less distortion than a mere limitation of these peaks, and is thus more acceptable than those obtained in the prior art.

The invention will be better understood and other sections thereof will appear from the following description and the appended drawings, in which.

Figure 13:
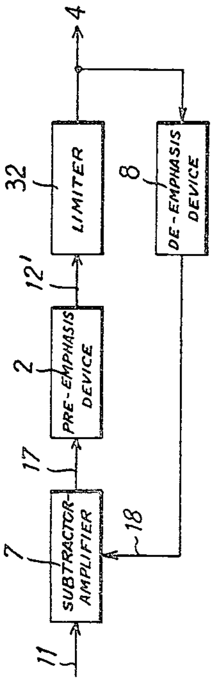
FIG. 13 shows a transmission system using a video-frequency circuit according to the invention.

The video signal to be transmitted is applied to an input 10 and is filtered in low-pass filter 1, with a pass-band $f_1$, whose use will be explained further on. The signal $S_1$ which appears at output 11 of filter 1 is applied to the input of a pre-emphasis circuit 2, which delivers at its output 12 the pre-emphasized signal $S_2$. The latter is applied to the input of a "spreader" circuit 3, which, as already mentioned, limits the peaks of signal $S_2$ which exceed in absolute value a certain threshold level determined by the channel admission capacity. This circuit also increases the duration of these peaks. The signal $S_3$ which appears at the output 13 of spreader 3 is applied to a transmission channel 4 of any kind, which usually includes transmitter stages, a radio transmission path and receiver stages. At the output 14 of channel 4 there appears signal $S_4$ which, apart from defects due to transmission (e.g. added noise), is the same as signal $S_3$.

Signal $S_4$ is filtered by a low-pass filter 5. The signal $S_5$, collected at output 15 of this filter, is applied to a de-emphasis circuit 6 whose characteristic is the inverse of that of circuit 2. The output 16 of the de-emphasis circuit supplies a signal $S_6$.

The object of the low-pass filter 5 is to limit the bandwidth of its input signal to the bandwidth of the useful signal, with a view to suppressing noise components outside this useful band. The latter is determined by the maximum frequency component $f_s$ which has to be transmitted from one end of the chain to the other. The pass-band $f_5$ of filter 5 will thus normally be equal to $f_s$.

Figure 1:
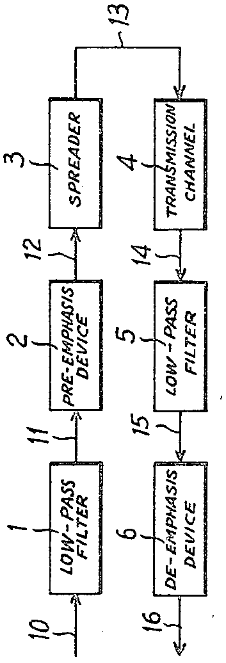
FIG. 1 is the circuit diagram of a transmission arrangement using a transmitter circuit according to the invention.

As will be appreciated by one versed in the art, the arrangement of FIG. 1 differs from known arrangements only by the substitution of a spreader for the limiter.

The benefit of this substitution will now be shown.

It will be assumed that the pre-emphasis is of a conventional type including a differentiating circuit, i.e. its effect on signal $S_1$, determined by its intantaneous level $N_1$, is such that the instantaneous level $N_2$ of signal $S_2$ is given by the relation:

$$N_2=N_1+\frac{1}{2\pi f_p}\frac{dN_1}{dt}$$

From the above expression it is immediately seen that for a given bandwidth $f_1$ of the input signal, the effect of pre-emphasis increases as the coefficient $f_p$ decreases.

For this reason, the coefficient $f_p$, which has the dimensions of a frequency, will be termed "characteristic frequency" of the pre-emphasis: the constant $\frac{1}{2}\pi f_p$ will be termed "pre-emphasis time constant."

The ratio $f_1/f_p$ is the "degree of pre-emphasis."

The de-emphasis device will be the inverse of the pre-emphasis characteristic and will conventionally include an integrating circuit.

Figure 2:
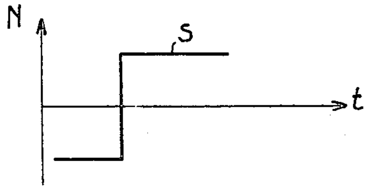
FIGS. 2 to 8 show a series of curves illustrating the operation of the arrangement of FIG. 1.

A stepped signal S, of instantaneous level N, including a steep transition from a lower level N, including a steep transition from a lower level N″ to a higher level N′ as shown in FIG. 2, will now be considered.

It is of course impossible to transmit a stepped signal of this kind without distortion, since this would call for an unlimited bandwidth.

Figure 3:
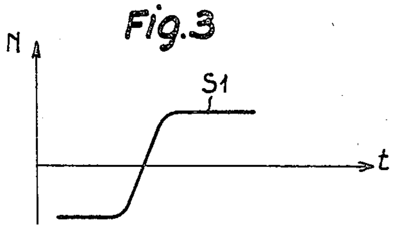

Signal S, applied to input 10 of low-pass filter 1 of FIG. 1 gives rise, at the output of this filter, to a signal $S_1$ whose transition is no longer instantaneous on account of the filtering by the low-pass filter (FIG. 3).

Figure 4:
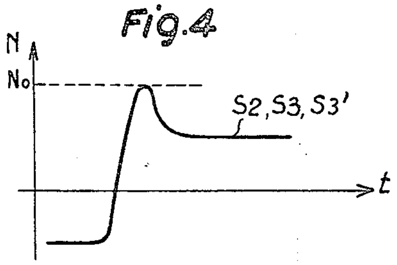

FIG. 4 shows the signal $S_2$ resulting from pre-emphasizing signal $S_1$, this pre-emphasis involving, at the input of the upper step of the signal, a peak reaching the maximum level $N_m$ and whose height above level N′, i.e. $N_m-N'$, is proportional to that of the step, on the one hand, and approximately proportional to the degree of pre-emphases $f_1/^f_p$, on the other. In FIG. 4 it is assumed that the degree of pre-emphasis is sufficiently low to ensure that the peak $N_m$ does not exceed the positive limitation threshold $N_o$ of the spreader, determined as a function of the channel admission capacity 4. Under these conditions, signal $S_3$ collected at the output 13 of the latter is identical to signal $S_2$. The same result would apply for a signal $S_3'$ which would be collected at output 13 of circuit 3 if the latter were a conventional limiter with a positive threshold $N_o$.

Figure 5:
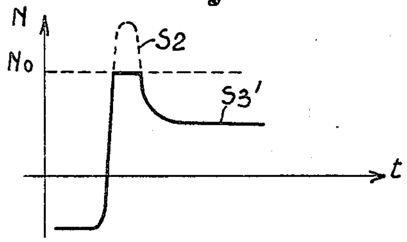

FIG. 5 shows the signal $S_2$ resulting from pre-emphasizing signal $S_1$ when the degree of pre-emphasis is sufficiently high to cause the positive peak to be substantially higher than $N_o$. It also shows the signal $S_3'$ that would be collected at the output 13 of circuit 3 if the latter, according to known prior art, were a conventional limiter, and not a spreader. The signals $S_3'$ and $S_2$ differ only during the time interval for which level $N_2$ exceeds $N_o$.

It is known that protection from noise at the receiver improves as the ratio $f_5/f_p$ increases. Since the peaks are approximately proportional to $f_1/f_p$, it is useful in this respect to make $f_1$ as small as possible, in other words $f_1=f_s=f_5$.

This will be assumed to be the case henceforth.

This being so, the reception filter 5 suppresses the noise components outside the useful band but introduces no substantial distortion (there would be no distortion at all if filters 1 and 5 were ideal filters with a rectangular amplitude-frequency characteristic with no phase distortion).

The action of filter 5 may therefore be ignored when examining the output signal of the de-emphasis circuit 6.

The case where a conventional limiter is substituted for spreader 3 will be considered first.

Figure 6:
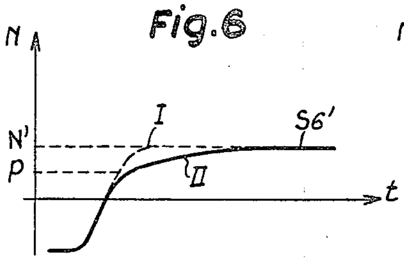

FIG. 6 shows the signal $S_6'$ which would be obtained at the output of filter 6 depending on whether at the transmitter the limiter has exerted no action (case of FIG. 4) or has exerted a limiting action (case of FIG. 5). The two signals $S_6'$ differ only during a certain time interval. The corresponding parts I and II of the two signals are respectively shown in dotted and in full lines. It will be noted that, if the limiter had no effect then, the input signal of circuit 6 is little different from the output signal of circuit 2, and there appears at output 16 a signal $S_6'$ (I) which is not very different from signal $S_1$.

But if the limiter has acted (as in the case of FIG. 5), then the input signal of circuit 6 is appreciably different from the output signal of circuit 2, and there appears at output 16 a signal $S_6'$ (II) which is considerably distorted. During a first period, whose duration is of the order of magnitude of that of the pre-emphasis peak, the transition is approximately as rapid as though there were no limiting. However during this first period the signal reaches only the intermediate level $p$. This first period is followed by a second in which the transition is much slower. It is found that the difference $N'-p$ increases with the value of the limitation suffered by the peak, and that the change from level $p$ to level N′ is effected approximately following an exponential with a time constant equal to the pre-emphasis time constant.

This explanation shows why, in the conventional art $f_p$ cannot be reduced as much as would be desirable from the point of view of protection from noise. Reducing $f_p$ causes excessive distortion of the useful signal.

The improvement according to the invention will now be examined.

Nothing is changed if the pre-emphasized signal $S_2$ does not exceed the critical level $N_o$, since, under these conditions, the spreader will not act any more than the limiter considered previously.

But if the pre-emphasized signal does exceed the critical level $N_o$ (FIG. 7) the spreader, as already mentioned, besides limiting the signal $S_2$ to $N_o$, extends level $N_o$ beyond the time at which $N_2$ is not less than $N_o$.

Experiment shows, and theory confirms, that the desirable extension of the signal portion above level $N_o$ depends on the height $N_m-N'$ of the peak and on the height $N_m-N_o$ of the suppressed part of the peak. Good results are obtained when the area added to the peak through its widening is approximately equal to the area deduced from it by limitation, as shown in FIG. 7, where the signal $S_3$ is shown in full line and the signal $S_2$ is shown dotted over the part where it differs from $S_3$.

Figure 7:
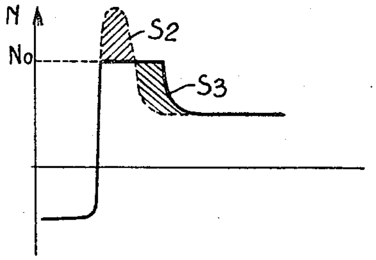
Figure 8:
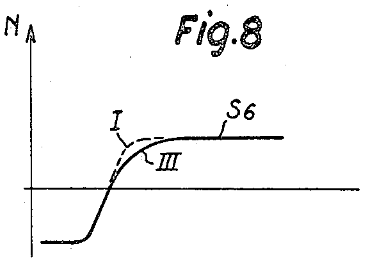

FIG. 8 shows the signals $S_6$ obtained respectively at output 16 of circuit 6, when a spreader is used, depending on whether the case of FIG. 4 or of FIG. 7 is considered. These two signals differ only in respect of parts I (case of FIG. 4) and III (case of FIG. 7). Since the de-emphasis circuit commonly employs an integrating circuit, by spreading the pre-emphasized signal and adding an area approximately equal to the area of the limited portion of the signal, the integrator effectively integrates the area of the original $S_2$ signal.

Limitation at a level $N_o$ of a given peak reaching a level $N_m$ higher than $N_o$ produces much less distortion of the final signal with a spreader than with a conventional limiter, as can be seen by comparing the signal III of FIG. 8 with the signal II of FIG. 6.

In all the above an upward stepping signal has been considered.

Matters are of course symmetrical in the case of a downward stepping signal. The pre-emphasis peak is then directed downwards, and the limiter, or the spreader, then limits the negative level, generally to a level equal to $-N_o$.

A description will now be given of modes of realization of the spreader circuit 3 of FIG. 1.

Figure 9:
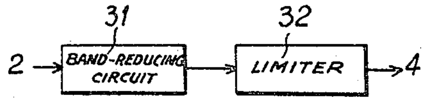
FIG. 9 is the circuit diagram of an embodiment of a spreader.

In a first mode of realization, the block diagram of which is shown in FIG. 9, the spreader consists of a series circuit comprising a conventional limiter 32 preceded by a circuit 31, whose pass-band is variable with the level of its input signal, so that for signal levels for which the limiter has no effect, this pass-band is at least as wide as the pass-band $f_1$ of filter 1, but for levels exceeding either the positive or the negative limitation threshold, the pass-band is reduced to a specified value or to a value dependent on the level of the applied signal, so as to cause approximately the required lengthening of the peak.

Figure 10:
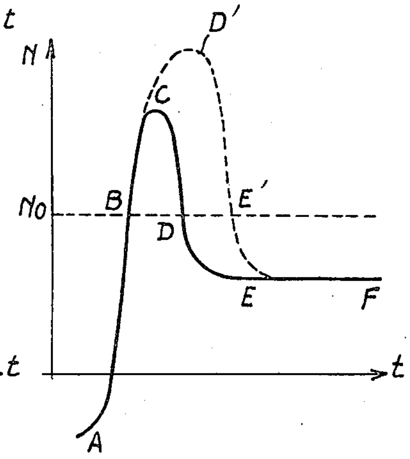
FIG. 10 is a curve showing the operation of the arrangement of FIG. 9.

FIG. 10 shows this mode of action. The signal $S_2$ applied to device 31 is shown in full lines (A, B, C, D, E, F).

When level $N_2$ exceeds level $N_0$ the pass-band of device 31 is automatically reduced so that the output signal from device 31 takes the form A, B, C, D', E', F.

The time during which the signal applied to limiter 32 remains above the threshold $N_0$ is thus increased from BD to BE'.

Beyond E', the pass-band of device 31 becomes again at least equal to $f_1$ and the output signal from circuit 31 quickly resumes the same level as its input signal.

The signal supplied by limiter 32 is then A, B, D, E', F having a peak of an increased duration.

Figure 11:
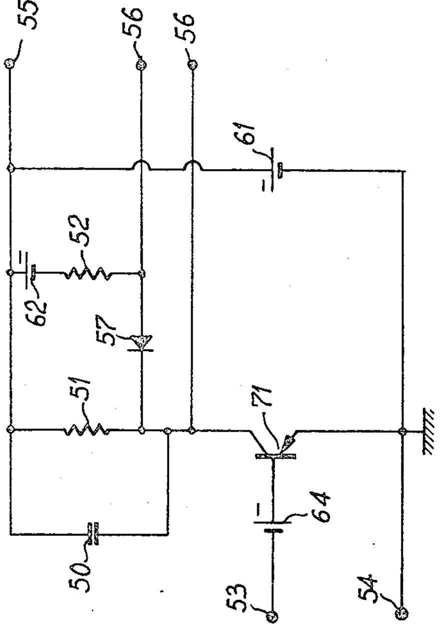

FIG. 11 shows a detailed circuit of a spreader according to the block diagram of FIG. 9, for the case for which the frequency band is reduced to a value determined for a level $N_2$ algebraically less than $-N_0$. This spreader acts only on negative level peaks of signal $S_2$.

A transistor amplifier 71 of the p-n-p type is connected with its emitter grounded, the input signal $S_2$ being between terminal 53, connected through a bias source 64 to the base of the transistor, and terminal 54, connected to the emitter of the transistor.

The collector load includes a resistance 51, of value $R_1$, whose first terminal is connected to the collector, and whose second terminal is connected to the negative pole of a D.C. source 61 whose positive pole is grounded.

The terminals of resistance 51 can be considered as those of a generator having an internal impedance equal to $R_1$, and supplying the amplified signal $S_2$.

In parallel with the resistance 51 are connected a condenser 50, of capacity C, and a circuit including in series a diode 57, a resistance 52 of value $R_2$ and a source of DC voltage 62, whose negative pole is connected to that of source 61. The anode of diode 57 is connected to the positive pole of source 62 through resistance 52.

The voltage of source 62 is so adjusted that diode 57 conducts when level $N_2$ is algebraically higher than level $-N_0$, and does not conduct for negative levels not transmitted by the limiter. When diode 57 conducts, resistance 51 is shunted by resistance 52 whose value $R_2$ is fairly low compared to the capacity C of condenser 50 so that the admittance offered by condenser 50 is negligible as compared to the conductance of resistance 52 over the whole band $f_1$ and that this band may be correctly passed. On the contrary, when diode 57 does not conduct, resistance $R_1$ of 51 being much greater than resistance $R_2$ of 52, the capacity of condenser 50 reduces the pass-band.

The signal collected between the output terminals 55 and 56 respectively connected to the first and second terminals of resistance 51, corresponds (for the negative peaks of $S_2$) to that of circuit 31 of FIG. 9, and can be applied to a corresponding limiter 32.

However, an important simplification can in fact be obtained. It consists in using diode 57 for a double purpose: (a) as explained above and (b) to effect the limitation. It is then only necessary to collect the output signal at the terminals of resistance 52, or more precisely, between terminals 55 and 56' connected to the common point of resistance 51 and diode 57.

As already stated, this circuit acts only on peaks of one polarity, i.e. peaks corresponding to a potential at terminal 56 sufficiently positive with respect to the potential of terminal 55, this corresponding to negative peaks of the input signal $S_2$.

To act on peaks of the other polarity of the input signal, all that is required is to reverse the connections of diode 57, the constants being on the other hand suitably chosen.

In either case, the widening of the peaks may be varied by varying the value of capacity 50 and/or resistance 51, this adjustment being preferably effected experimentally in view of an optimum result.

Figure 12:
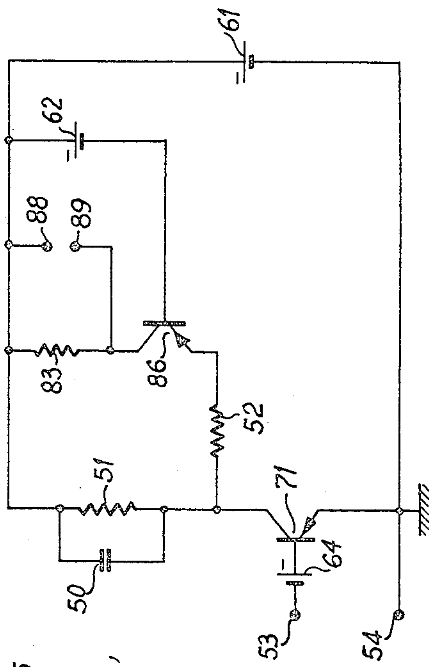
FIGS. 11 and 12 show two detailed circuits of a spreader according to FIG. 9.

An improvement, illustrated by FIG. 12, consists in replacing diode 57 by the base-emitter contacts of a second transistor. The emitter of transistor 86, of the p-n-p type, is connected to the collector of transistor 71 through resistance 52. Its collector is connected to the negative pole of source 61 through a resistance 83. Source 62 is connected by its negative pole to source 61 and by its positive pole to the base of transistor 86. The output signal from the spreader is collected between terminals 88 and 89 of resistance 83. The remaining parts of the circuit are unchanged from those shown in FIG. 11.

As described, the circuit of FIG. 12 acts on the positive peaks of signal $S_2$ for which terminal 89 is at a sufficiently negative potential.

To act on the peaks of the other polarity of the signal $S_2$, all that is required is to replace, for example, the p-n-p transistors 71 and 86 by n-p-n transistors with suitably chosen time constants and inverting the sense of the sources.

To act on the peaks of both polarities two circuits are connected in series, one acting on the positive peaks and the other on the negative peaks of $S_2$, these two circuits being connected together through a buffer stage.

The above mode of realization, either in the form of FIG. 11 or FIG. 12, requires for its correct operation that the values C, $R_1$ and $R_2$ of elements 50, 51 and 52 be accurately adjusted for the pass-band $f_1$ and for the pre-emphasis characteristic.

FIG. 13 shows a different mode of realization using a feedback loop and having the advantage of less critical adjustment of its components.

The signal $S_1$ obtained by low-pass filtering at the output of filter 1 (FIG. 1) is applied to the first input of a subtractor and amplifier circuit 7, whose output 17 is coupled to a pre-emphasis circuit 2 whose output 12' is connected to a conventional limiter 32 which limits at the desired positive and negative levels. The output of limiter 32 is connected not only to the input of channel 4 (FIG. 1) but also, through a de-emphasis circuit 8, with characteristics identical to those of the receiver de-emphasis circuit 6, to the second input 18 of the subtractor-amplifier 7.

Calling $S_8$ the output signal from circuit 8, the subtractor-amplifier 7 supplies the signal K ($S_1$–$S_8$), where K is the amplifier gain.

If the gain K, and hence the degree of negative feedback, are very high, the conditions required for the signal which appears at the input of channel 4 are fulfilled.

When $S_1$ is such that limiter 32 is not required to act, the signal $S_8$ is identical to the signal leaving the subtractor-amplifier 7. This situation gives total negative feedback of conventional performance, and it is then known that the signal $S_8$, which is the same as the signal applied to the input of the pre-emphasis circuit 2, will reproduce the signal $S_1$ with a gain less than but close to 1. The signal collected at the input of channel 4 will then be the desired pre-emphasized signal $S_2$.

If the limiter acts, for example for a positive peak, the signal $S_8$ is no longer the reproduction of $S_1$. As is well known, the action of the negative feed-back will be to produce at the input of the pre-emphasis circuit 2 a strongly positive signal, still exceeding the positive threshold level $N_0$, while $N_2$ has dropped below $N_0$, and this until signal $S_8$ reaches the desired level.

The invention is not restricted to the embodiments described and shown which were given solely by way of example.

This invention is applicable to all arrangements for transmitting a video-frequency signal, in particular a picture signal transmitted by a subcarrier in a colour television system.

1. In a video-frequency signal-translating arrangement including a pre-emphasis device for emphasizing the higher frequency components of the signals transmitted; amplifying means adapted to amplify the pre-emphasized signals over a normally broad frequency band when the signal level is below a predetermined value and over a reduced frequency band when the signal level exceeds said value, thereby extending the durations of the signal peaks, said amplifying means comprising an output circuit including a first resistance, a condenser connected in parallel across said first resistance, and a unidirectional current circuit including in series a second resistance much lower than said first resistance and a biased diode, said unidirectional current circuit connected in parallel across said first resistance, the bias of said diode being such that for signals below a predetermined value the diode is in the conducting state, thereby making said second resistance in parallel with said first resistance, while for signals exceeding said value the diode is in the non-conducting state, thereby disconnecting said second resistance; and means for clipping the time-extended peaks.

2. A video-frequency signal-translating arrangement as claimed in claim 1, wherein said amplifying means comprises a transistor having said output circuit.

3. A video-frequency signal-translating arrangement as claimed in claim 2, wherein said diode is constituted by the base-emitter space of a second transistor.

References Cited

UNITED STATES PATENTS

| | | | |
|---|---|---|---|
| 2,717,931 | 9/1955 | Duke | 179—171 |
| 3,200,345 | 8/1965 | Luckenbach et al. | 330—29 |
| 3,109,991 | 11/1963 | Ocko | 328—171 |
| 3,117,278 | 1/1964 | Johnson | 325—65 |
| 3,288,930 | 11/1966 | Johnson | 179—1 |
| 3,290,433 | 12/1966 | De France | 178—5.4 |

ROBERT L. GRIFFIN, Primary Examiner

ROBERT L. RICHARDSON, Assistant Examiner

U.S. Cl. X.R.

178—6; 307—267; 330—31